No. 801,193. PATENTED OCT. 3, 1905.
W. C. HOWARD & J. McQUISTON.
SOLDERING IRON.
APPLICATION FILED DEC. 22, 1904.
2 SHEETS—SHEET 1.
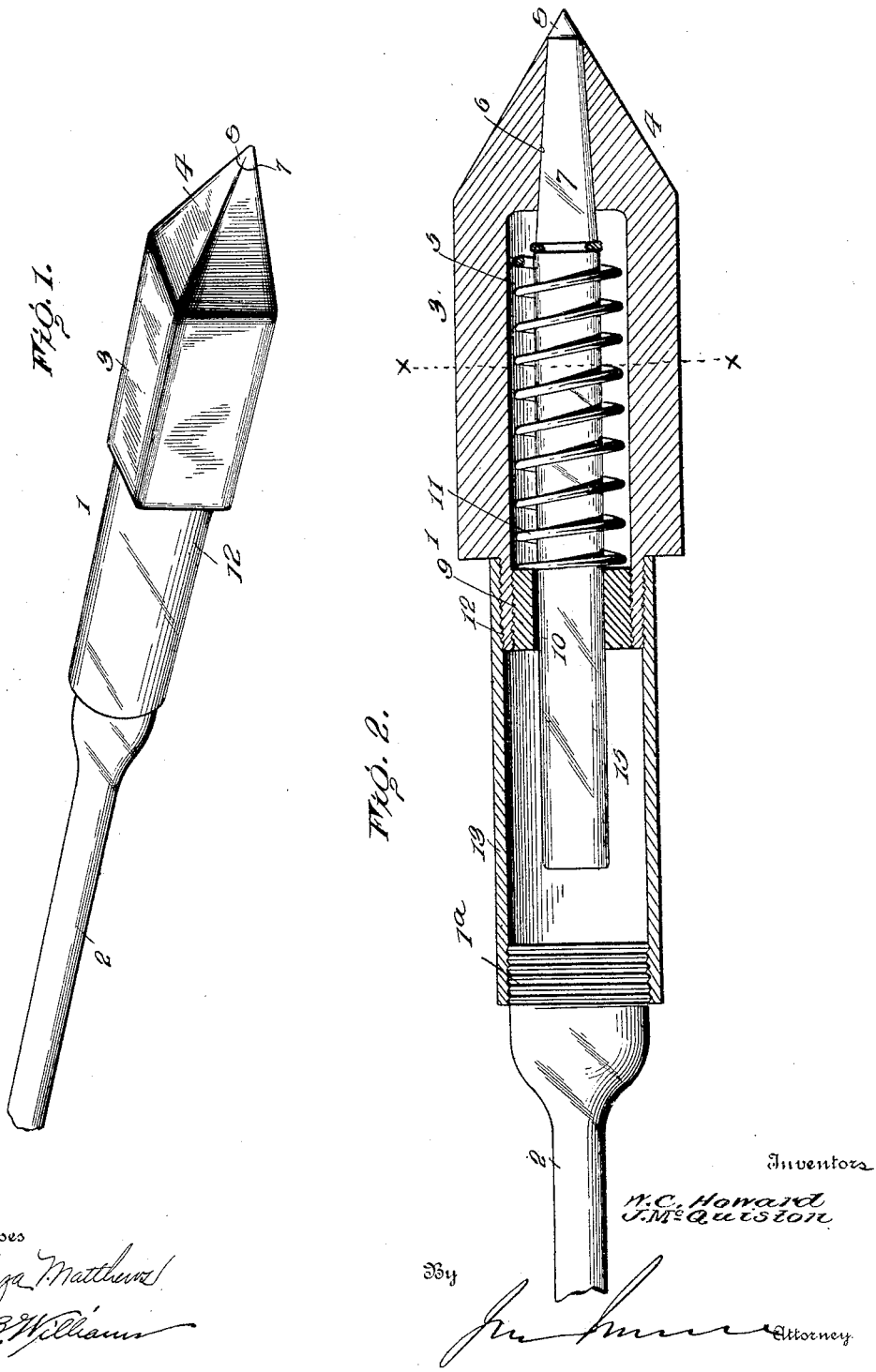

No. 801,193. PATENTED OCT. 3, 1905.
W. C. HOWARD & J. McQUISTON.
SOLDERING IRON.
APPLICATION FILED DEC. 22, 1904.
2 SHEETS—SHEET 2.
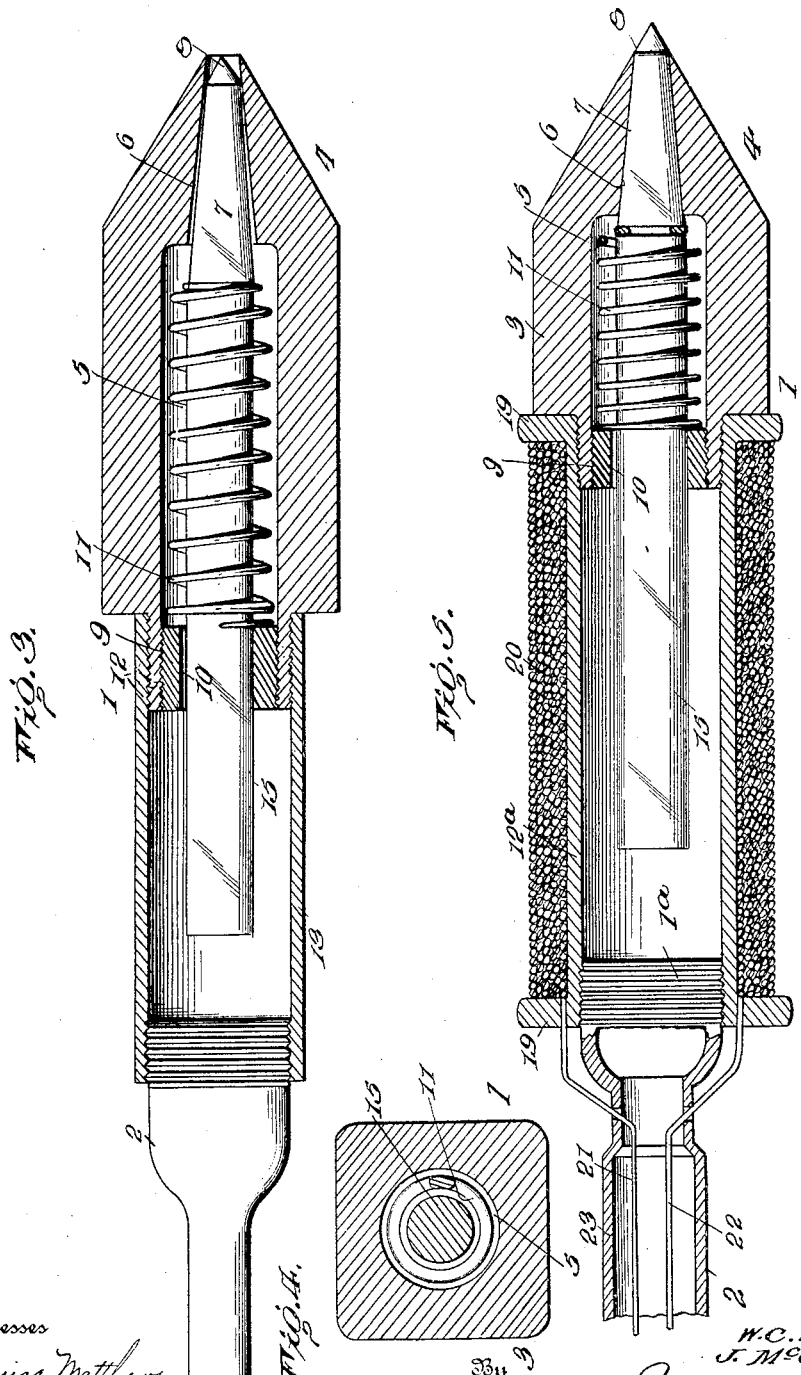
Witnesses
Inventors
W. C. Howard
J. McQuiston
Attorney

UNITED STATES PATENT OFFICE.

WILLIAM C. HOWARD AND JESSE McQUISTON, OF NEWCASTLE, PENNSYLVANIA, ASSIGNORS OF ONE-THIRD TO JOHN C. PATTERSON, OF NEWCASTLE, PENNSYLVANIA.

SOLDERING-IRON.

No. 801,193.  Specification of Letters Patent.  Patented Oct. 3, 1905.

Application filed December 22, 1904. Serial No. 237,965.

*To all whom it may concern:*

Be it known that we, WILLIAM C. HOWARD and JESSE McQUISTON, citizens of the United States, residing at Newcastle, in the county of Lawrence and State of Pennsylvania, have invented new and useful Improvements in Soldering-Irons, of which the following is a specification.

This invention relates to improvements in soldering-irons.

The object of the invention is to provide in a soldering-iron a chamber to receive a stick of solder, the melted solder passing through an opening, the latter being controlled by a valve which also acts as the point of the iron.

The invention further compehends improvements in the specific details of construction, the advantages of which will be hereinafter described, and particularly pointed out in the claims.

In the drawings, Figure 1 is a perspective view. Fig. 2 is a longitudinal section of our improved soldering-iron. Fig. 3 is a similar view illustrating the operation of the invention. Fig. 4 is a transverse section on the line $x$ $x$, Fig. 2. Fig. 5 is a longitudinal section of our invention, illustrating its use in connection with a heater.

The same numerals refer to like parts in all the figures.

1 indicates a soldering-iron having a handle 2 and iron 3, which tapers at its end, as at 4. The iron 3 is hollow to form a chamber 5, and communicating with the chamber and in line with the center of the taper 4 is a tapering outlet-opening 6, in which is seated a tapering copper plug-valve 7, pointed on its outer end at 8. The pointed end 8 of the valve conforms to the taper 4 of the iron, so that when the valve is seated the taper 4 and pointed end 8 present a uniform operative iron end for the soldering purposes, as will be readily understood. The inner end 9 of the chamber 5 is threaded to receive a threaded collar 10, and against the plug-valve 7 and the collar 10 bears a spring 11, preferably of German silver or of other material which will not be affected by heat, to normally force the valve to its seat 6. The inner end 12 of the iron 3 is reduced and threaded to receive the internally-threaded end of a barrel 13, in the opposite end of which is threaded the end $1^a$ of the handle 1. The barrel 13 communicates with and forms a continuation of the chamber 5, and in this chamber and passing through the coils of the spring 11 is the stick of solder 15.

Assuming the parts are in the position shown in Fig. 1, the iron is thrust into a fire and heated, which melts the stick of solder, whereupon the iron is ready for use. The solder having been melted sufficiently, the operator presses the point of the valve against the work, which forces the said valve from its seat and permits the solder to flow from the chamber. When sufficient solder has been delivered to the work, pressure on the valve is released and the spring normally seats it again and closes the chamber. The operation of spreading the solder over the desired points or the hole being covered is now performed with the end of the iron as with a tool of this type.

In the disclosure shown in Fig. 5 the barrel $12^a$ has formed on its ends flanges 19, and between these flanges is coiled wire 20, the terminals 21 and 22 of the wire passing through the hollow handle 23 and are connected with a source of electricity, the coils 20 forming an electric heater.

When the stick of solder has been melted and used, another stick is introduced in the chamber by unscrewing the handle 2 or the iron 3, as found most convenient.

The invention is extremely simple and durable and the arrangement of the parts is such that liability of the parts becoming out of order is reduced to a minimum.

What we claim as new is—

1. A soldering-tool comprising a tapered iron formed with a chamber and a valve-opening, the opening being formed at the apex of the tapered iron and communicating with the chamber, a valve fitting in the opening and projecting beyond the same, the end of the valve extending beyond the opening being tapered to conform to the taper of the iron, said tapered end of the valve forming a continuation of the taper of the iron when the valve is seated, and means for normally creating pressure on the valve to close the opening.

2. A soldering-iron formed with a chamber and a valve-opening which communicates with the chamber, a pointed valve fitting in the opening, a threaded collar screwed into the chamber, a spring bearing against the collar and the valve to close the latter, a barrel threaded to the iron, and a handle threaded to the barrel.

3. A soldering-tool comprising a tapering iron formed with a chamber and an opening, the opening being at the apex of the taper, a tapering valve fitting in and extending beyond the opening, the end of the valve which extends beyond the opening being tapered and forming a continuation of the tapered surface of the iron when said valve is closed, a spring in the chamber, means in the chamber for adjusting the tension of the spring, said spring bearing against the valve and the adjusting means, the solder flowing from the chamber when pressure is exerted on the valve to overcome the tension of the spring.

4. A soldering-iron formed with a solder-chamber and a valve-opening which communicates with the chamber, a pointed valve fitting in the opening, a threaded collar screwed into the chamber, a spring in the chamber, said spring bearing against the threaded collar and the valve to close the latter, a barrel secured to the iron, and a handle secured to the barrel.

In testimony whereof we affix our signatures in presence of two subscribing witnesses.

WILLIAM C. HOWARD.
JESSE McQUISTON.

Witnesses:
  C. W. FENTON,
  CHAS. H. YOUNG.